(12) United States Patent
Lorenzoni

(10) Patent No.: US 11,198,220 B2
(45) Date of Patent: Dec. 14, 2021

(54) SAFETY SYSTEM

(71) Applicant: Datalogic IP Tech S.r.l., Calderara di Reno (IT)

(72) Inventor: Enrico Lorenzoni, Zola Predosa (IT)

(73) Assignee: Datalogic IP Tech S.R.L., Calderara di Reno (IT)

(*) Notice: Subject to any disclaimer, the term of this patent is extended or adjusted under 35 U.S.C. 154(b) by 564 days.

(21) Appl. No.: 16/020,801

(22) Filed: Jun. 27, 2018

(65) Prior Publication Data
US 2019/0001496 A1    Jan. 3, 2019

(30) Foreign Application Priority Data
Jun. 28, 2017  (EP) ..................... 17425068

(51) Int. Cl.
*G05B 19/04*    (2006.01)
*G05B 19/418*    (2006.01)
(Continued)

(52) U.S. Cl.
CPC ........... *B25J 9/1676* (2013.01); *B25J 19/022* (2013.01); *B25J 19/06* (2013.01); *F16P 3/144* (2013.01);
(Continued)

(58) Field of Classification Search
CPC ........ B25J 19/022; B25J 19/06; B25J 9/1676; F16P 3/144; G01S 17/04; G01V 8/20;
(Continued)

(56) References Cited

U.S. PATENT DOCUMENTS 6,166,371 A * 12/2000 Milbrath ................. F16P 3/144
250/221
9,927,797 B2 * 3/2018 Stubbs ............... G05B 19/0428
(Continued)

FOREIGN PATENT DOCUMENTS

DE    19946476 A1    3/2001
EP    2045628 A1    4/2009
(Continued)

OTHER PUBLICATIONS

European Search Report corresponding to EP Application No. 17425068.8, dated Dec. 8, 2017, 11 pages.

*Primary Examiner* — Harry Y Oh
(74) *Attorney, Agent, or Firm* — Foley & Lardner LLP

(57) ABSTRACT

Safety system (100) for an industrial environment (10) comprising a robotic machine wherein at least a moving head (12) of the robotic machine is movable within a first area (1) and a second area (2) of the industrial environment (10), the safety system (100) comprising:

Figure 1:
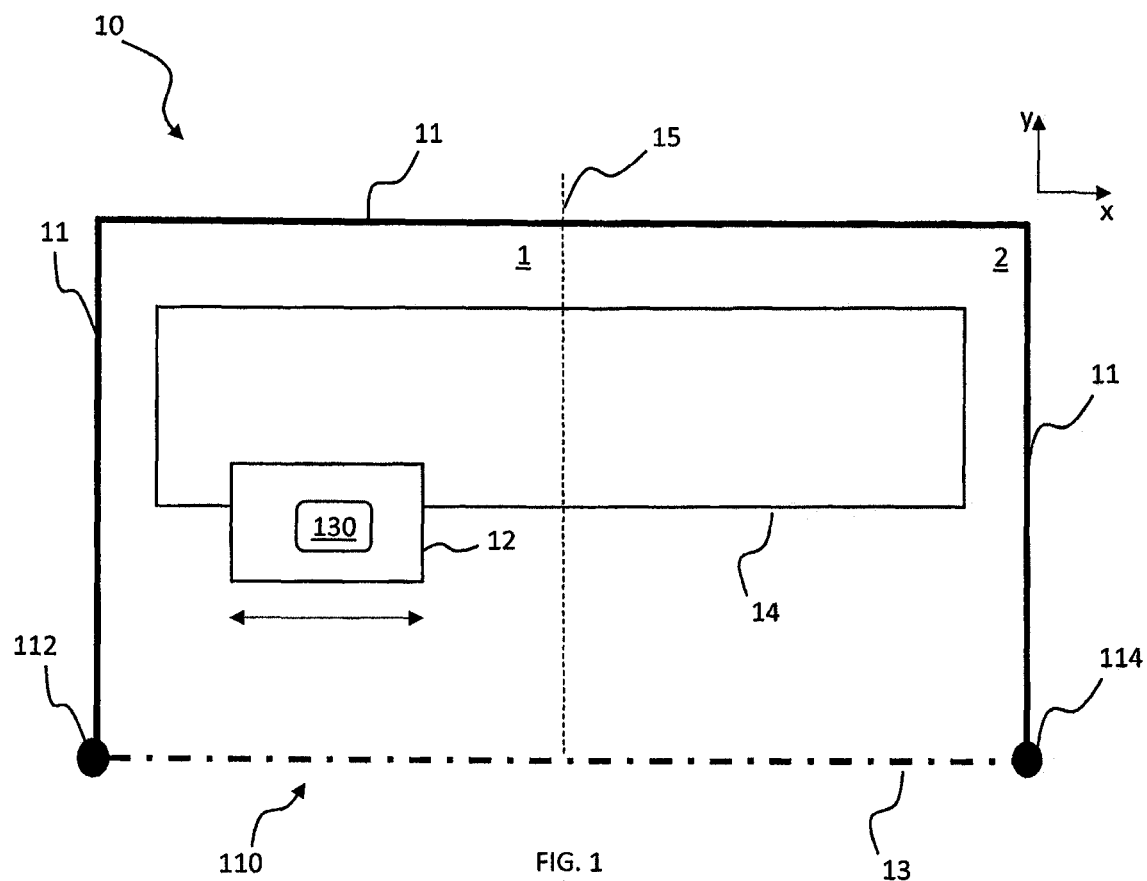

a light curtain (110) extending between a first vertical support (112) and a second vertical support (114) to cover both the first area (1) and the second area (2);

a head position sensor (130) adapted to detect the position of the moving head (12) within the first area (1) and the second area (2);

a safety control unit (140);

wherein the light curtain (110) comprises a first couple of two TOF sensors (F1, F3) respectively positioned on the first and second vertical supports (112, 114), the safety control unit (140) being adapted to process output signals received (Continued)

from the TOF sensors (F1, F3) and the head position sensor (130) so as to selectively and dynamically secure the first area (1) and the second area (2).

20 Claims, 5 Drawing Sheets

(51) Int. Cl.
*B25J 9/16* (2006.01)
*B25J 19/06* (2006.01)
*B25J 19/02* (2006.01)
*G01V 8/20* (2006.01)
*F16P 3/14* (2006.01)
*G01S 17/04* (2020.01)

(52) U.S. Cl.
CPC ............... *G01V 8/20* (2013.01); *G01S 17/04* (2020.01); *G05B 2219/39091* (2013.01); *G05B 2219/40202* (2013.01); *G05B 2219/40203* (2013.01)

(58) Field of Classification Search
CPC ........... G05B 2219/39091; G05B 2219/40202; G05B 2219/40203
See application file for complete search history.

(56) References Cited

U.S. PATENT DOCUMENTS

| | | | |
|---|---|---|---|
| 10,379,513 B2* | 8/2019 | Higuchi | F16P 3/14 |
| 10,384,345 B2* | 8/2019 | Takahashi | B25J 9/1676 |
| 10,404,971 B2* | 9/2019 | Braune | G01B 11/24 |
| 10,618,170 B2* | 4/2020 | Takahashi | B25J 9/1666 |
| 2002/0186299 A1* | 12/2002 | Cofer | F16P 3/142 |
| | | | 348/152 |
| 2012/0182155 A1* | 7/2012 | Sato | B25J 9/1674 |
| | | | 340/686.6 |
| 2012/0327190 A1* | 12/2012 | Massanell | B25J 9/1676 |
| | | | 348/46 |
| 2015/0022788 A1* | 1/2015 | Shinha | H04N 9/3173 |
| | | | 353/85 |
| 2015/0049911 A1* | 2/2015 | Doettling | G06T 7/285 |
| | | | 382/103 |
| 2017/0144307 A1* | 5/2017 | Rublee | G06Q 10/08 |

FOREIGN PATENT DOCUMENTS

| | | |
|---|---|---|
| EP | 2 253 417 B1 | 7/2011 |
| EP | 2 354 624 A1 | 8/2011 |
| EP | 2 506 034 B1 | 5/2013 |

* cited by examiner

SAFETY SYSTEM

CROSS REFERENCE TO RELATED APPLICATIONS

This application claims the benefit of priority from European Application No. EP17425068, filed Jun. 28, 2017, which is incorporated herein by reference in its entirety.

The present invention relates to a safety system and to a light curtain of a safety system.

In particular, the present invention relates to the field of safety devices for industrial machinery such as, for example, wood working machines.

As disclosed by U.S. Pat. No. 6,166,371, industrial machines which incorporate robotic movement present a safety concern when humans are required to work near a moving machinery. Should a human working near the machine become careless and come into direct contact with the moving machinery, a serious accident may occur, resulting in the loss of human life or limb. To reduce the risk of such injury, many machines utilize safety devices, which block humans from coming into contact with moving machinery.

U.S. Pat. No. 6,166,371 discloses a light curtain safety system that comprises a plurality of light emitters (LEDs) and a plurality of light detectors all positioned on a single board. The board comprises a plurality of linearly arranged wells with each well having a top portion and a bottom portion. The light emitters and light detectors are alternately placed in the bottom of the wells. The light emitters are positioned within the bottom portions of alternate wells such that light is emitted toward and out of the top portions of alternate wells. The light emitted from the wells forms a "light curtain" extending upward from the board. The detectors are positioned in the bottom portions of alternate wells that do not contain light emitters. The detectors are positioned within the wells to receive and detect light entering each alternate well from the top portion of the well and propagating to the bottom portion of the well. The detectors will normally receive no light from the light emitters because they are insulated from the light emitters within different wells. However, if an object comes into contact with the light curtain, light from the light emitters is reflected back to the board and the reflected light contacts at least one of the detectors. Detection of light by one of the detectors signals a breach of the light curtain. The light curtain safety system can define several work zones in relation to one robotic machine and selectively allow entry into certain work zones and prevent entry into those work zones at different times during normal operation of the robotic machine.

EP 2 253 417 discloses a safety system comprising a first sensor, which is movable and located on a mobile machine so as to detect penetration of objects and persons into a movable machining area A defined about the movable machine. The first sensor can be an optical safety laser scanner. The safety system also comprises a second sensor adapted to detect persons in a loading area B, adjacent to machining area A. The second sensor can comprise a light barrier formed by stationary transmitters and movable receivers.

The Applicant observes that the solution disclosed by U.S. Pat. No. 6,166,371 has several drawbacks. First, in order to cover multiple zones, it requires the use of multiple light curtains to define various zones within a working space of the machine. Second, it discloses a dual well that enables to determine whether the board as a whole is faulty or properly emitting light due to a burnt-out LED(s) in the board. However, it does not allow to individually check the operation of the LEDs and to identify any change (e.g. decrease) in the power level of each LED. Third, as the LEDs and receivers are horizontally positioned on the floor they can get dirty and/or damaged easily. Moreover, due to the use of LEDs, the height of the light curtain is intrinsically affected by a dead zone either in the far field or in the near field. Moreover, the beam spot size of the LEDs increases moving away from the LEDs themselves. This creates a problem because moving away from the LEDs the distance between the emitted light beams decreases so that the resolution of the light curtain changes. This is against the recommendations of the international safety standards (e.g. IEC 61508 and IEC 62061), which define a minimum size for the objects to be detected between two light beams and defines that such a size should be constant for all the area covered by the light curtain.

The Applicant further observes that the solution disclosed by EP 2 253 417 is disadvantageous because, by requiring two movable sensors, it is quite complex to make and maintain. Moreover, the first sensor made of an optical safety laser scanner is quite expensive. Moreover, by sweeping a continuous area, the laser scanner has a very fine resolution capable of detecting wood shavings, debris and dust particles too, which may cause false alarms.

The Applicant thus faced the technical problem of providing an improved safety system for industrial machinery.

In a first aspect, the present invention thus relates to a safety system for an industrial environment comprising a robotic machine wherein at least a moving head of the robotic machine is movable within a first area and a second area of the industrial environment, the safety system comprising:
  a light curtain extending between a first vertical support and a second vertical support to cover both the first area and the second area;
  a head position sensor adapted to detect the position of the moving head within the first area and the second area;
  a safety control unit;
characterized in that the light curtain comprises a first couple of two TOF sensors respectively positioned on the first and second vertical supports, the safety control unit being adapted to process output signals received from the TOF sensors and the head position sensor so as to selectively and dynamically secure the first area and the second area.

In a second aspect, the present invention relates to a light curtain of a safety system for selectively and dynamically securing a first area and a second area of an industrial environment wherein at least a moving head of a robotic machine is movable within the first area and the second area, the light curtain comprising:
  a first vertical support and a second vertical support;
  a first couple of two TOF sensors respectively positioned on the first and second vertical supports and respectively adapted to provide output signals indicating that a breach of the light curtain occurred at a first range of distances and at a second range of distances from the respective TOF sensor.

In the present description and claims, the expression "horizontal" and "vertical" are used with reference to a floor, which is generally horizontal, of the industrial environment. Moreover, the expression "horizontal" and "vertical" are used with reference to geometric and structural elements of the safety system and components thereof, as they are oriented in the normal working position of the safety system when in use, e.g. with the supports of the light curtain vertically located with respect to the floor.

The present invention in at least one of the aforementioned aspects can have at least one of the following preferred characteristics.

In a preferred embodiment, the light curtain comprises a second couple of two TOF sensors respectively positioned on the first and second vertical supports of the light curtain. This preferred embodiment advantageously enables to guarantee redundancy of sensors, as required by the above mentioned international safety standards.

The light beams emitted by the TOF sensors are suitably spatially separated. For example, the two TOF sensors of the first couple face each other at different heights (from a floor of the industrial environment) on the first and second vertical supports. For example, the two TOF sensors of the second couple face each other at different heights (from the floor of the industrial environment) on the first and second vertical supports. For example, the two TOF sensors of the second couple are positioned on the first and second vertical supports of the light curtain above or below the respective TOF sensors of the first couple. Thanks to the above features taken alone or combined, light beams emitted by the TOF sensors are at different heights so that the light curtain protects the first area and the second area at different heights.

Preferably, the TOF sensors are spaced apart on the respective vertical supports so that the vertical distance between adjacent light beams emitted by the TOF sensors meets the requirements of international safety standards (e.g. IEC 61508 and IEC 62061). In particular, said vertical distance is of about 500 mm for a body resolution, with a minimum distance from the ground of 250 mm, preferably 300 mm. This advantageously enables, on the one side, to detect light beams breaches by human body (as requested by said safety standards) and, on the other side, to avoid light beams breaches by smaller objects such as wood shavings, debris and dust particles that may cause false alarms.

Preferably, each TOF sensor on the first vertical support is adapted to provide an output signal indicating that a breach of the light curtain occurred within a first range of distances from the TOF sensor.

Preferably, each TOF sensor on the second vertical support is adapted to provide an output signal indicating that a breach of the light curtain occurred within a second range of distances from the TOF sensor.

Preferably, each TOF sensor is adapted to provide a different output signal depending on the fact that a breach of the light curtain occurred within the respective first/second range of distances or outside it.

In an embodiment, each TOF sensor on the first vertical support is configured to provide a first (e.g. high or low) digital output when a breach of the light curtain is detected within the first range of distances and a second (e.g. low or high) digital output when a breach of the light curtain is detected outside the first range of distances.

In an embodiment, each TOF sensor on the second vertical support is configured to provide a first (e.g. high or low) digital output when a breach of the light curtain is detected within the second range of distances and a second (e.g. low or high) digital output when a breach of the light curtain is detected outside the second range of distances.

Preferably, the first range of distances starts at the first vertical support. Preferably, the second range of distances starts at the second vertical support.

Preferably, the first range of distances covers the extent of the first area and the second range of distances covers the extent of the second area. Suitably, the extent of the first area and the extent of the second area are computed along a horizontal direction parallel to light beams emitted by the TOF sensors.

In a preferred embodiment, said the first range of distances corresponds to the extent of the first area plus a further extent substantially corresponding to the extent of the moving head (along said horizontal direction), whereby the first range of distances comprises a length of the second area, which is contiguous to the first area. Preferably, the second range of distances corresponds to the extent of the second area plus a further extent substantially corresponding to the extent of the moving head (along said horizontal direction), whereby the second range of distances comprises a length of the first area, which is contiguous to the second area. As explained in more detail below, this embodiment advantageously enables to properly secure the first area and the second area when the moving head is travelling from the first area to the second area and vice versa.

Suitably, the first area and the second area are distinct (two different areas). Preferably, the first area is nearby the second area. More preferably, the first area borders on the second area (i.e. the first area and the second area are contiguous).

Suitably, the first and second vertical supports of the light curtain are adapted to be spaced apart of a predetermined length L. Suitably, the predetermined length L is taken along a horizontal direction in a vertical plane formed by horizontal light beams emitted by the TOF sensors. The length L is suitably predetermined so as to cover the extent of the first area and the extent of the second area along said horizontal direction. Preferably, the first area extends from the first vertical support to a distance $L_1$ from the first vertical support along said horizontal direction. Preferably, the second area extends from the second vertical support to a distance $L_2$ from the second vertical support along said horizontal direction. The distance $L_1$ can be equal to $L_2$ and equal to L/2.

Preferably, the safety control unit is adapted to selectively and dynamically secure the first area and the second area, depending from the output signals received from the TOF sensors and the head position sensor.

In a preferred embodiment, the safety control unit is adapted to selectively and dynamically secure the first area and the second area by activating a safety measure in the industrial environment, depending from the output signals received from the TOF sensors and the head position sensor. For example, the safety measure can be the generation of an alarm (e.g. audio alarm and/or visual alarm) and/or stop of the moving head, and/or any other suitable and useful alarm.

Preferably, the safety control unit is adapted to secure the first area when at least one of the output signals received from the TOF sensors on the first vertical support indicates a breach of the light curtain within the first range of distances and the output signal received from the head position sensor indicates presence of the moving head within the first area.

Preferably, the safety control unit is adapted to secure the second area when at least one of the output signals received from the TOF sensors on the second vertical support indicates a breach of the light curtain within the second range of distances and the output signal received from the head position sensor indicates presence of the moving head within the second area.

When the first area and the second area are not secured, the safety control unit is adapted to let the first area and the second area free to operate in normal working conditions (without generation of any safety measure).

Preferably, the safety control unit is configured to activate a safety measure in the industrial environment when:
- at least one of the output signals received from the TOF sensors on the first vertical support indicates a breach of the light curtain within the first range of distances and the output signal received from the head position sensor indicates presence of the moving head within the first area; and/or
- at least one of the output signals received from the TOF sensors on the second vertical support indicates a breach of the light curtain within the second range of distances and the output signal received from the head position sensor indicates presence of the moving head within the second area.

Preferably, the safety control unit is configured to let the industrial environment free, in working condition, when:
- the output signal received from the head position sensor indicates presence of the moving head within the first area and none of the output signals received from the TOF sensors on the first vertical support indicates a breach of the light curtain within the first range of distances, independently of the output signals received from the TOF sensors on the second vertical support; or when
- the output signal received from the head position sensor indicates presence of the moving head within the second area and none of the output signals received from the TOF sensors on the second vertical support indicates a breach of the light curtain within the second range of distances, independently of the output signals received from the TOF sensors on the first vertical support.

Preferably, each TOF sensor comprises a light transmitter and a photodetector.

Preferably, the light beams emitted by the transmitters of the TOF sensors are parallel to each other.

Preferably, each light transmitter is adapted to emit light pulses with generally horizontal light beams. Suitably, the horizontal light beams emitted by the transmitters of the TOF sensors lies in a vertical plane defining the light curtain.

Preferably, each photodetector is adapted to receive light pulses emitted by the respective transmitter and reflected back to the photodetector. For each TOF sensor, light pulses are reflected back to the photodetector either by an object breaching the light curtain or by the vertical support opposed to the TOF sensor.

Preferably, each TOF sensor comprises suitable optics adapted to collimate the light beams emitted by the respective transmitter.

Preferably, each TOF sensor comprises circuitry adapted to measure the time of flight of light pulses emitted by the light transmitter and reflected back to the photodetector. The time of flight can be measured as the time taken by a light pulse emitted by the light transmitter to get back to the photodetector or by modulating the emitted light pulse with an RF carrier, then measuring the phase shift of that carrier on the light pulse reflected back to the photodetector.

Preferably, the light transmitter comprises a laser source. The laser source is preferably adapted to emit light pulses of infrared or near infrared light.

In a preferred embodiment, the safety control unit is adapted to periodically perform an integrity test for evaluating the integrity of detections performed by each TOF sensor. This is advantageous in that it enables to individually identify any malfunction of each single TOF sensor, including power level drop. Moreover, it enables the integrity of the TOF sensors to be guaranteed without requiring TOF sensors redundancy.

Preferably, the safety system comprises at least one reflecting target. Preferably, in order to perform said integrity test, the safety control unit is adapted to periodically compare actual detections made by the TOF sensors with reference detections made in relation to the at least one reflecting target.

Preferably, the safety control unit is adapted to signal a malfunction when the actual detection is different from the reference detection.

More preferably, the safety system comprises a first reflecting target for testing the TOF sensor(s) on the first vertical support and a second reflecting target for testing the TOF sensor(s) on the second vertical support. In this case, in order to perform said integrity test, the safety control unit is preferably adapted to periodically compare actual detections made by the TOF sensors with reference detections made in relation to the corresponding first/second reflecting target. Preferably, the first reflecting target is at the first vertical support and the second reflecting target is at the second vertical support. Preferably, the first reflecting target consists of at least one portion of the first vertical support and the second reflecting target consists of at least one portion of the second vertical support.

Figure 2:
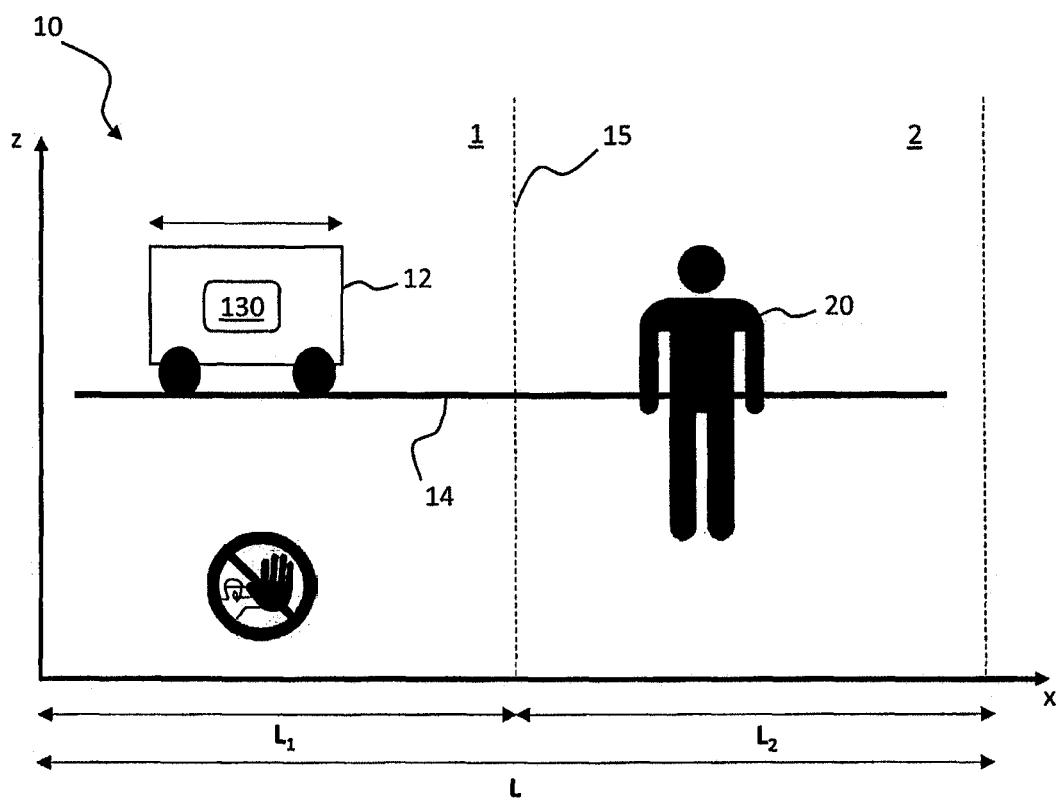
Figure 3:
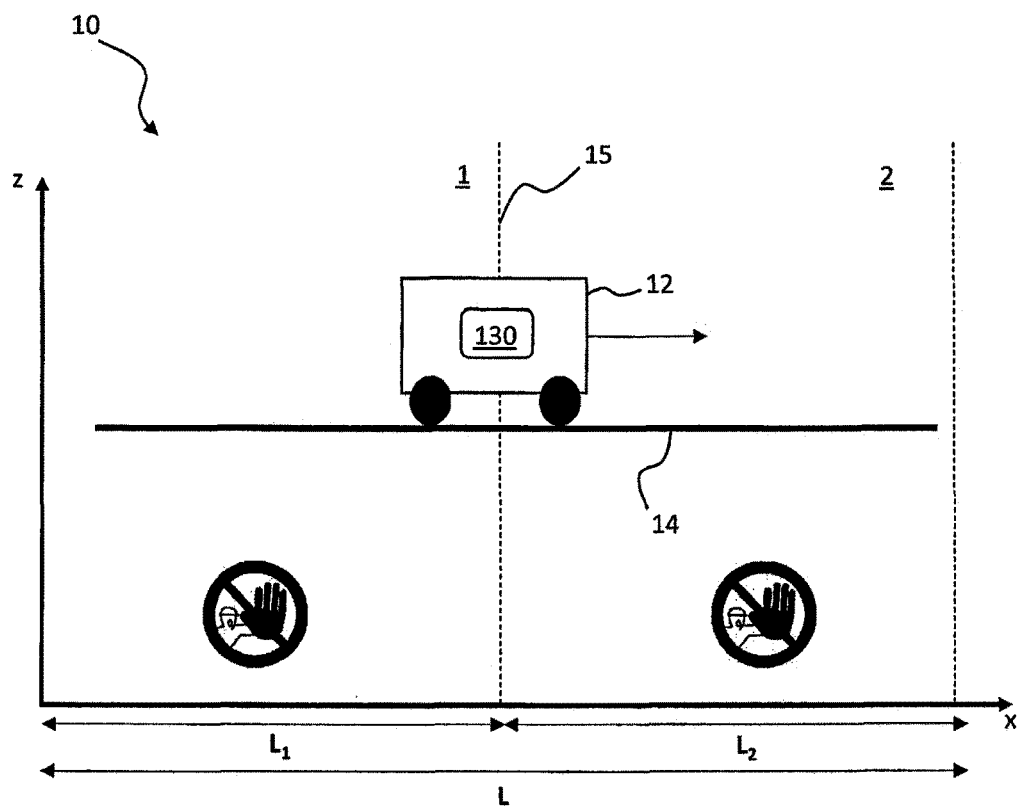
Figure 4:
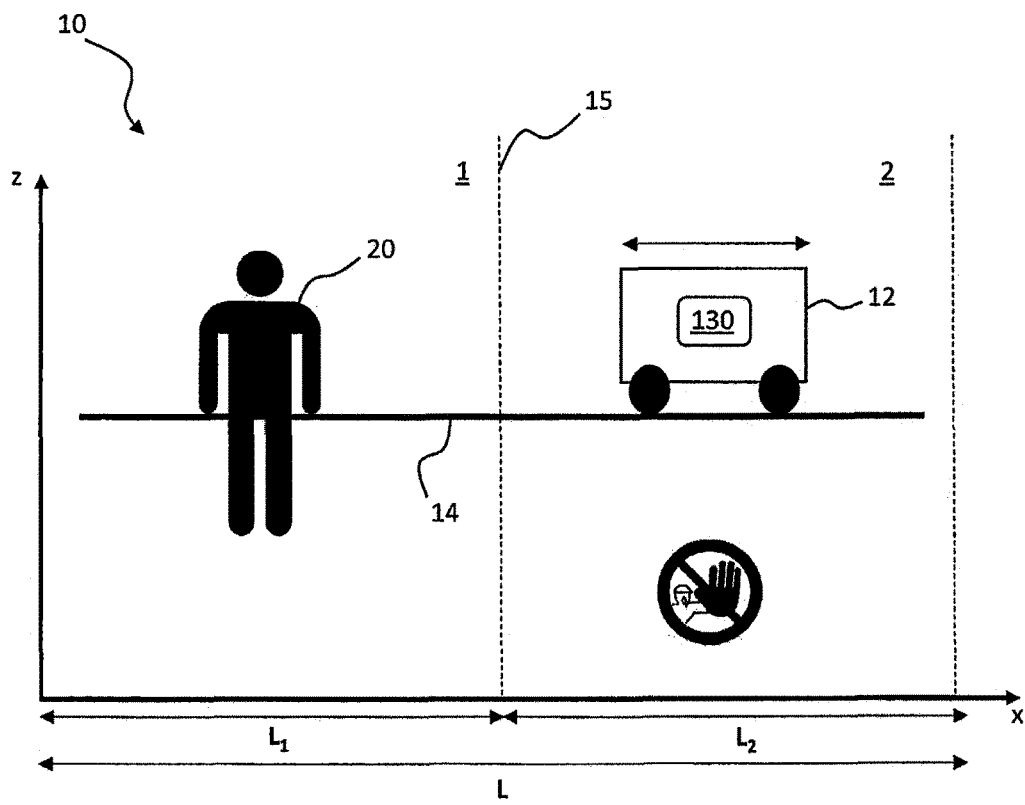
Figure 5:
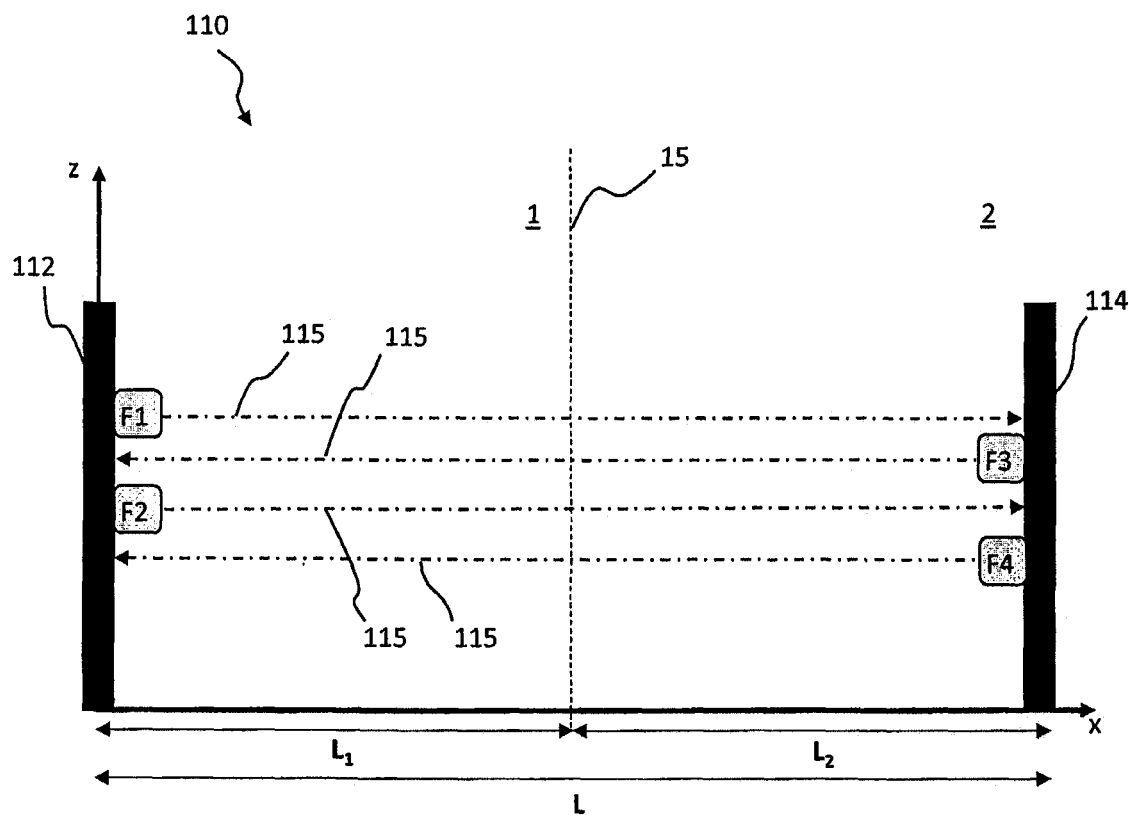
Figure 6:
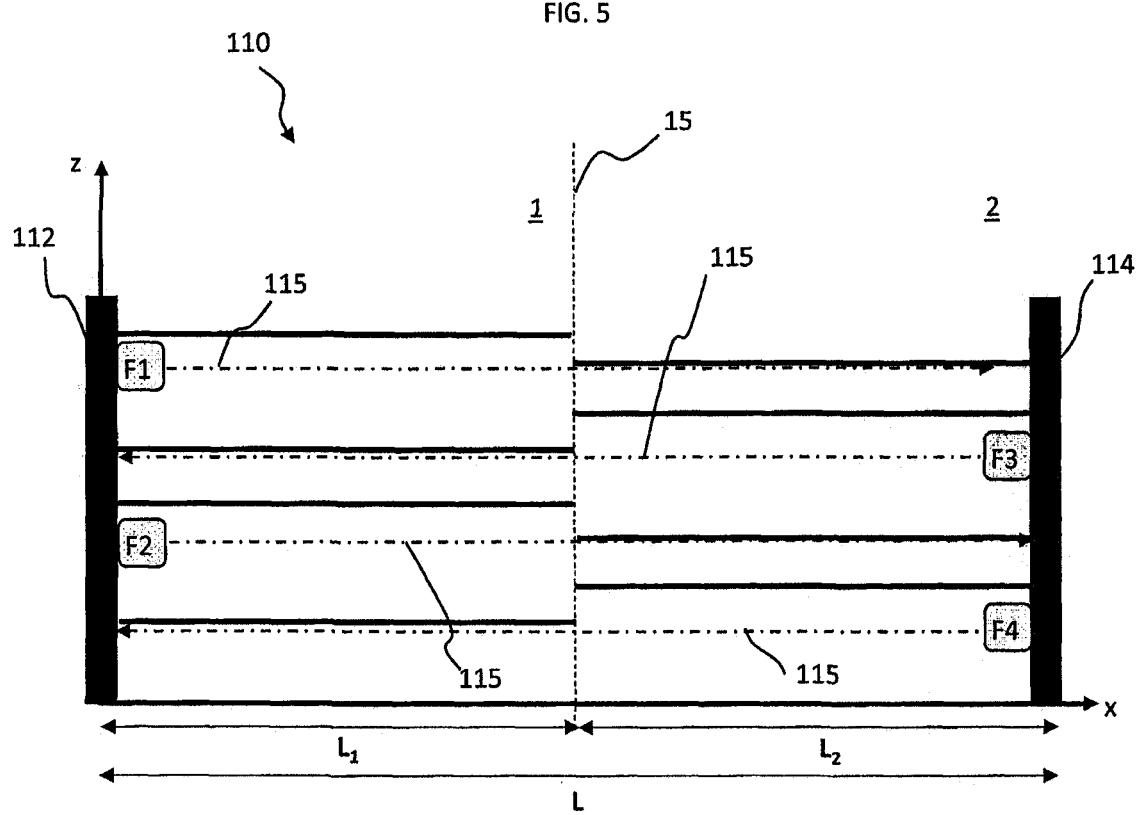
Figure 7:
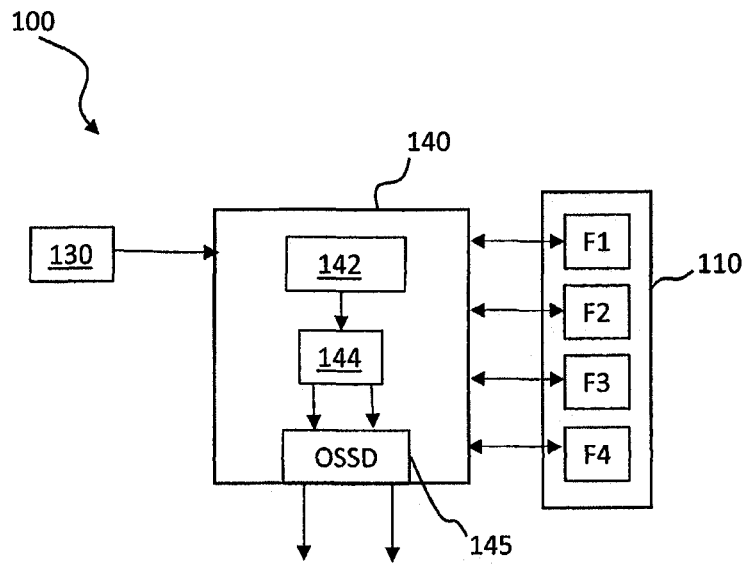
Figure 8:
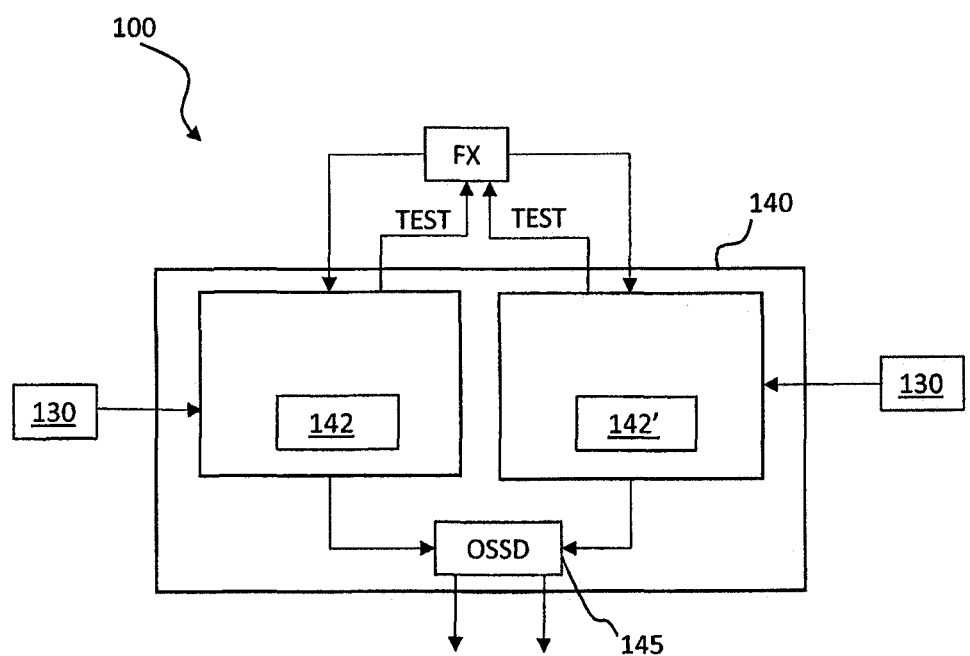
Figure 9:
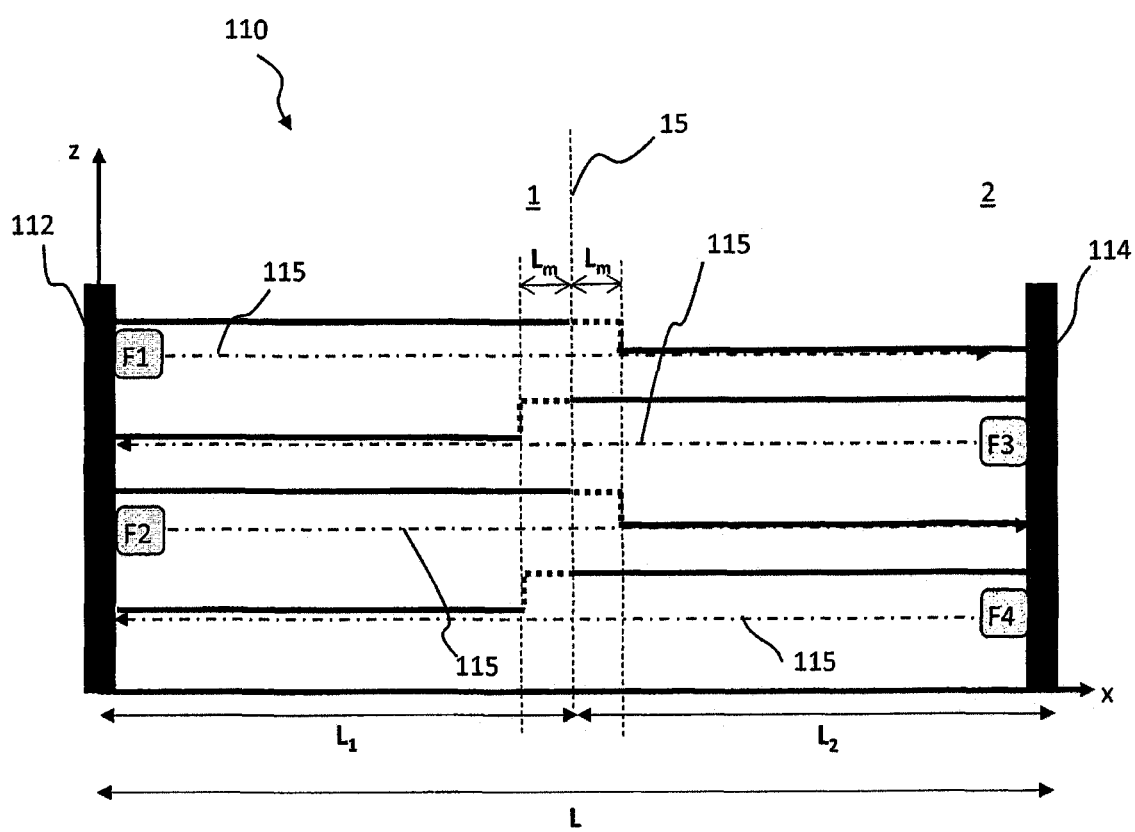

Further characteristics and advantages of the present invention will become clear from the following detailed description of some example embodiments thereof, provided just as non-limiting examples, said description being made with reference to the attached drawings, in which:

FIG. 1 schematically shows a top view of an industrial environment comprising a moving head movable within a first area and a second area;

FIGS. 2-4 schematically show three side views of the industrial environment of FIG. 1 in three different situations;

FIG. 5 schematically shows a side view of a light curtain of a safety system according to an embodiment of the invention;

FIG. 6 schematically shows output signals of TOF sensors of the light curtain of FIG. 5 according to a first embodiment of the invention;

FIG. 7 schematically shows a safety control unit of a safety system according to an embodiment of the invention;

FIG. 8 schematically shows a safety control unit of a safety system according to another embodiment of the invention;

FIG. 9 schematically shows output signals of TOF sensors of the light curtain of FIG. 5 according to a second embodiment of the invention.

FIG. 1 shows an industrial environment 10 comprising a robotic machine (not shown) with a moving head 12.

The industrial environment 10 can be a work station of a machining plant such as, for example, a wood processing plant and the robotic machine can be, for example, a wood working machine.

The moving head 12 is fixedly coupled to the robotic machine (i.e., it is a single piece with the robotic machine or it is a distinct piece but connected to the robotic machine so that they move as if they were a single piece). In alternative, the moving head 12 can be movably coupled to the robotic machine (i.e., it is connected to the robotic machine so that it can move with respect to the robotic machine, which is stationary).

Only by way of example, FIGS. 1-4 show moving head 12 fixedly coupled to the robotic machine (moving as well with the moving head 12). Moreover, only by way of example, FIGS. 1-4 schematically show moving head 12 fixedly coupled to robotic machine that moves on wheels. Other arrangements are, however, within the scope of the invention such as, for example, a moving head in the form of an articulated arm suitably coupled to the robotic machine.

The moving head 12 is movable, for example, according to one or more machining axes. In the example shown in the figures, the moving head 12 is movable according to machining axis X.

The moving head 12 can be configured in a known manner to perform one or more tasks, for example cutting, milling, boring, etc.

The moving head 12 can move between a first area 1 and a second area 2 within the industrial environment 10. In the embodiment shown in the figures, the moving head 12 can travel from the first area 1 to the second area 2 and vice versa, by moving along the machining axis X. In the embodiment shown, the first area 1 borders on the second area 2. In other words, the first area 1 and the second area 2 are contiguous and share a partition plane 15 parallel to a plane Y-Z (see reference axes X,Y,Z shown in the figures).

The first area 1 and the second area 2 dynamically represent to distinct areas, in particular a working area and a loading area, of the industrial environment 10 wherein a workpiece is machined by the moving head 12 and a workpiece is loaded by an operator 20, respectively. In the example shown in the figures, the workpiece is loaded on a working table 14 (which is stationary) of the industrial environment 10. Depending on the position of the moving head 12, the first area 1 and the second area 2 dynamically represent the working area and the loading area.

In the embodiment shown in FIG. 1, the first area 1 and the second area 2 as a whole are physically protected on three sides by physical barriers 11, such as Plexiglas walls, wallboards, masonry wall (or similar) that leave an open side 13 to enable access to the industrial environment 10. In the embodiment shown in the figures, the free open side 13 lies in a vertical plane X-Z, perpendicular to the floor of the industrial environment 10 (which is parallel to a plane X-Y).

The free open side 13 is protected by a safety system 100 according to the invention that enables to selectively and dynamically make the first area 1 and the second area 2 secure or free.

Indeed, the working area, representing the area wherein the moving head 12 is machining a workpiece, needs to be secured to avoid any accident that may result in an injury of operator 20. On the other side, the loading area, representing the area wherein the operator 20 loads the workpiece, needs to be freely accessible.

The dynamic safety system 100 according to the invention selectively and dynamically make the first area 1 and the second area 2 safe or free, depending on the position of the moving head 12.

The dynamic safety system 100 is adapted to secure the industrial environment 10 by activating a safety measure anytime an object (e.g. the operator himself 20 or an arm alone of the operator 20) tries to access the working area (dynamically represented by the first area 1 or the second area 2).

For example, the safety measure can be the generation of an alarm (e.g. audio alarm and/or visual alarm) and/or stop of the moving head 12, and/or any other suitable and useful alarm.

FIG. 2 schematically shows a situation wherein the moving head 12 is machining a workpiece in the first area so that: the first area 1 represents the working area, the second area 2 represents the loading area, and the first area 1 should be secured leaving free the second area 2. In this situation, the safety system 100 is adapted to activate the safety measure anytime an object tries to access the first area 1.

FIG. 3 schematically shows a situation wherein the moving head 12 is travelling from first area 1 to the second area 2. As explained in more detail with reference to FIG. 9, in this situation, the safety system 100 is adapted to activate the safety measure as long as the moving head 12 is in the first area 1 and an object tries to access the first area 1, or when the moving head 12 reaches the second area 2 and an object tries to access the second area 2 or a portion of the first area wherein a part of the moving head 12 is still present (when the moving head 12 crossing the partition plane 15 is placed in part in the first area 1 and in part in the second area 2).

FIG. 4 schematically shows a situation wherein the moving head 12 is machining a workpiece in the second area 2 so that: the second area 2 represents the working area, the first area 1 represents the loading area, and the second area 2 should be secured leaving free the first area 1. In this situation, the safety system 100 is adapted to activate the safety measure anytime an object tries to access the second area 2.

As schematically shown in FIG. 7, the safety system 100 comprises a light curtain 110, a head position sensor 130 and a safety control unit 140.

As schematically shown in FIGS. 1 and 5-6, the light curtain 110 lies in the vertical plane X-Z of the free open side 13 or in a plane parallel to it.

The light curtain 110 extends between a first vertical support 112 and a second vertical support 114. The first vertical support 112 and the second vertical support 114 lie in a vertical direction parallel to Z axis (and perpendicular to the floor).

In the embodiment shown in the figures, the first and second vertical supports 112, 114 exemplarily are in the shape of two vertical rods.

In the embodiment shown in the figures, the first and second vertical supports 112, 114 are spaced apart of a length L taken along a horizontal direction parallel to machining axis X. The length L is suitably predetermined so as to cover the extent of the first area 1 and the extent of the second area 2 along said horizontal direction. The first area 1 extends along said horizontal direction for a first length $L_1$ starting from the first vertical support 112 towards the second vertical support 114. The second area 2 extends along said horizontal direction for a second length $L_2$ starting from the second vertical support 114 towards the first vertical support 112. In the embodiment shown, $L_1=L_2=L/2$.

However, the invention also includes the case wherein $L_1$ and $L_2$ are not equal to L/2 and/or the case wherein $L_1$ and $L_2$ are not equal to each other and/or the case wherein the first area 1 and/or the second area 2 is spaced apart from the first vertical support 112 and the second vertical support 114, respectively. Moreover, the invention also includes the case wherein the first area 1 and the second area 2 are nearby but not contiguous (that is, there is a space between them).

As explained in more detail below, the embodiment shown in the figures wherein the first area 1 and the second area 2 start from the respective vertical supports 112, 114 (i.e. are not spaced apart from the respective vertical supports 112, 114) and wherein the first area 1 and the second area 2 are contiguous is advantageous because it avoids or minimizes any shadows issue.

As schematically shown in FIGS. 5-6, the light curtain 110 comprises a first couple of TOF sensors F1, F3, and a second couple of TOF sensors F2, F4. The TOF sensors F1 and F2 are positioned on the first vertical support 112. The TOF sensors F3 and F4 are positioned on the second vertical support 114. The TOF sensors F1 and F2 face the TOF sensors F3 and F4.

The TOF sensor F1, F2, F3, F4 are positioned on the associated vertical supports 112, 114 at predetermined heights from the floor that are different from each other.

In the embodiment shown in FIG. 5, the TOF sensor F1, F3, F2, F4 are respectively positioned on the associated vertical supports 112, 114 at decreasing heights from the floor.

In the embodiment shown in FIG. 5, the TOF sensor F1, F3, F2, F4 are equally spaced in the vertical direction. In the embodiment shown in FIG. 5, the TOF sensor F1, F3, F2, F4 are equally spaced in the vertical direction of a distance of about 500 mm, with a minimum distance from the floor of the lowest TOF sensor (e.g. F4) higher than 250 mm, preferably of at least 300 mm.

Each TOF sensor F1, F2, F3, F4 comprises a laser source (not shown) adapted to emit light pulses of infrared or near infrared light, and a photodiode (not shown) adapted to receive the light pulses emitted by the respective laser source and reflected back to the photodiode. For example, TOF sensors F1, F2, F3, F4 are TOF sensors S85 by Datalogic S.r.l. with avalanche photodiode S2382 by Hamamatsu and laser diode red 200 mW LM6277 by Hamamatsu.

As schematically shown in FIG. 5, each TOF sensor F1, F2, F3, F4 is adapted to emit light pulses with light beams 115 generally parallel to each other and parallel to the X axis in the plane of the light curtain 110. The light beams 115 form a light barrier of the light curtain 110.

Each TOF sensor F1, F2 on the first vertical support 112 is configured to have a switching threshold for a high/low digital output at a first predetermined range of distances from the TOF sensor F1, F2. On the other side, each TOF sensor F3, F4 is configured to have a switching threshold for a high/low digital output at a second predetermined range of distances from the TOF sensor F3, F4.

This means that, when each TOF sensor F1, F2, F3, F4 detects a breach of the light curtain 110 within the respective first/second predetermined range of distances, it has a high digital output while, when it detects a breach of the light curtain 110 beyond the respective first/second predetermined range of distances, it has a low digital output (or vice versa).

In the example shown in the figures, the first/second range of distances is computed for each TOF sensor F1, F2, F3, F4 starting from the position of the TOF sensor itself. In other words, for each TOF sensor F1, F2, F3, F4 the first/second range of distances starts from the respective vertical support 112, 114. This embodiment is advantageous because it avoids or minimizes any shadows issue.

In an alternative embodiment (not shown), each TOF sensor F1, F2, F3, F4 can be configured to have a threshold for a high/low digital output at a first/second predetermined range of distances spaced apart from the TOF sensor itself. This embodiment, however, may suffer of shadow problems in case of a presence of an object between the vertical support 112 or 114 and the starting point of the respective first/second predetermined range of distances.

In the embodiment shown in FIG. 6, the first range of distances corresponds to the extent $L_1$ of the first area 1 and the second range of distances corresponds to the extent $L_2$ of the second area 2. Moreover, said first and second predetermined range of distances are equal to each other ($L_1=L_2=L/2$).

In particular, in the embodiment shown in FIG. 6, each TOF sensor F1, F2 on the first vertical support 112 is configured to provide a first (e.g. high) digital output when a breach of the light curtain 110 (that is, a breach of the corresponding light beam 115) is detected within the first area 1 and a second (e.g. low) digital output when a breach of the light curtain is detected within the second area 2, including breach of the light curtain 110 due to the second vertical support 114. Moreover, each TOF sensor F3, F4 on the second vertical support 114 is configured to provide a first (e.g. high) digital output when a breach of the light curtain 110 is detected within the second area 2 and a second (e.g. low) digital output when a breach of the light curtain 110 is detected within the first area 1, including breach of the light curtain 110 due to the first vertical support 112. The high digital output of TOF sensors F1, F2, F3, F4 is schematically shown in FIG. 6 with a full line above the corresponding light beam 115, while the low digital output is schematically shown with a full line at the same level of the corresponding light beam 115. It is noted that when no breach of the light curtain 110 occurs by an object unrelated to the light curtain 110, the light beams 115 from TOF sensors F1, F2 are at the end hitting the opposite first vertical support 112 without obstruction, while the light beams 115 from TOF sensors F3, F4 are at the end hitting the opposite second vertical support 114 without obstruction.

The head position sensor 130 is adapted to detect the position of the moving head 12 within the first area 1 and the second area 2.

In the embodiment shown, the head position sensor 130 is positioned on the movable head 12. In alternative or in addition, the head position sensor 130 can comprise one or more position sensors (not shown) positioned along the path wherein the moving head 12 is moving.

As schematically shown in FIG. 7, the safety control unit 140 is adapted to receive output signals from the TOF sensors F1, F2, F3, F4 and from the head position sensor 130 and to process them so as to selectively and dynamically make the first area and the second area secure. In particular, the safety control unit 140 is adapted to activate the safety measure anytime an object breaches the light curtain 110 at the working area (dynamically represented by the first area 1 or the second area 2).

The processing is performed by a processor 142 such as, for example, a PLC (Programmable Logic Controller).

Preferably, the safety control unit 140 comprises an OSSD (Output Signal Switching Device) device 145 adapted to output redundant safety OSSD digital signals according to the above mentioned international safety standards. Preferably, the OSSD digital signals are adapted to take both a first "safety" value (e.g. high) adapted to activate the safety measure in the industrial environment 10 or to take both a second "free" value (e.g. low) adapted to let the industrial environment 10 free, in working condition. As stated above, the safety measure can be, for example, the generation of an alarm (e.g. audio alarm and/or visual alarm) and/or stop of the moving head 12. As shown in FIG. 7, according to the above mentioned international safety standards, the safety control unit 140 suitably comprises a diagnostic block 144, placed between the processor 142 and the OSSD device 145, adapted to check the integrity of the two OSSD digital signals. For example, the diagnostic block 144 is adapted to send a test pulse to the OSSD device 145 and to check that it is properly output at both outputs of the OSSD device 145.

Preferably, the safety control unit 140 is configured to output the first safety value so as to activate the safety measure in the industrial environment 10 when:

at least one of the output signals received from the TOF sensors F1, F2 on the first vertical support 112 indicates a breach of the light curtain 110 within the first range of distances and the output signal received from the head position sensor 130 indicates presence of the moving head 12 within the first area 1; and/or at least one of the output signals received from the TOF sensors F3, F4 on the second vertical support 114 indicates a breach of the light curtain 110 within the second range of distances and the output signal received from the head position sensor 130 indicates presence of the moving head 12 within the second area 2.

Preferably, the safety control unit 140 is configured to output the second free value to let the industrial environment 10 free, in working condition, when:

the output signal received from the head position sensor 130 indicates presence of the moving head 12 within the first area 1 and none of the output signals received from the TOF sensors F1, F2 on the first vertical support 112 indicates a breach of the light curtain 110 within the first range of distances, independently of the output signals received from the TOF sensors F3, F4; or the output signal received from the head position sensor 130 indicates presence of the moving head 12 within the second area 2 and none of the output signals received from the TOF sensors F3, F4 on the second vertical support 114 indicates a breach of the light curtain 110 within the second range of distances, independently of the output signals received from the TOF sensors F1, F2.

The value (e.g. safety value=1 and free value=0) taken by the OSSD digital signals output by the safety control unit 140 can be, for example, summarized by the following formula:

OSSD=(F1 AND TPT) OR (F2 AND TPT) OR (F3 AND (NOT TPT)) OR (F4 AND (NOT TPT))

wherein:

F1, F2, F3, F4 respectively represent the digital output signals received from TOF sensors F1, F2, F3, F4 (e.g. F1,F2,F3,F4=1 when a breach of light curtain 110 is detected within the respective first/second range of distances and F1,F2,F3,F4=0 when a breach of light curtain 110 is detected outside the respective first/second range of distances);

TPT represents the digital output signal received from the head position sensor 130 (e.g. TPT=1 when the moving head 12 is within the first area 1 and TPT=0 when the moving head 12 is within the second area 2).

According to a preferred embodiment of the invention, in order to suitably deal with the situation of the moving head 12 travelling from the first area 1 to the second area 2, the TPT is adapted to switch high/low value (1→0) when the leading edge of the movable head 12 enters the second area 2. On the other hand, in order to deal with the situation of the moving head 12 travelling from the second area 2 to the first area 1, the TPT is adapted to switch low/high value (0→1) when the leading edge of the movable head 12 enters the first area 1.

Moreover, in order to suitably deal with the situation of the moving head 12 travelling from the first area 1 to the second area 2 and vice versa, differently from what shown in FIG. 6, the first range of distances of the high/low digital output switching threshold for the TOF sensors F1, F2 is preferably extended to correspond to the extent $L_1$ of the first area 1 plus a further extent substantially corresponding to the extent $L_m$ of the moving head 12. Similarly, the second range of distances of the high/low digital output switching threshold for the TOF sensors F3, F4 is preferably extended to correspond to the extent $L_2$ of the second area 2 plus a further extent substantially corresponding to the extent $L_m$ of the moving head 12. This is schematically shown in FIG. 9 wherein each TOF sensor F1, F2 on the first vertical support 112 is configured to provide a first (e.g. high) digital output when a breach of the light curtain 110 is detected within a predetermined distance from the TOF sensor F1, F2 equal to $L_1+L_m$ and a second (e.g. low) digital output when a breach of the light curtain is detected within a range of distances from the TOF sensor F1, F2 going from $L_1+L_m$ to L, including breach of the light curtain 110 due to the second vertical support 114. Moreover, each TOF sensor F3, F4 on the second vertical support 114 is configured to provide a first (e.g. high) digital output when a breach of the light curtain 110 is detected within a predetermined distance from the TOF sensor F3, F4 equal to $L_2+L_m$ and a second (e.g. low) digital output when a breach of the light curtain 110 is detected within a range of distances from the TOF sensor F3, F4 going from $L_2+L_m$ to L, including breach of the light curtain 110 due to the first vertical support 112.

Thanks to the embodiment of FIG. 9, the safety measure is activated also when the leading edge of the movable head 12 travelling from the first area 1 to the second area 2 enters the second area 2, and an object tries to access a portion of the first area 1 wherein a part of the moving head 12 is still present (due to the fact that the moving head 12 crossing the partition plane 15 is placed in part in the first area 1 and in part in the second area 2). Similarly, the safety measure is activated also when the leading edge of the movable head 12 travelling from the second area 2 to the first area 1 enters the first area 1, and an object tries to access a portion of the first area 2 wherein a part of the moving head 12 is still present (due to the fact that the moving head 12 crossing the partition plane 15 is placed in part in the first area 1 and in part in the second area 2).

In a preferred embodiment, each TOF sensor F1, F2, F3, F4 is periodically tested by the safety control unit 140 in order to evaluate the integrity of the detection made by said TOF sensors F1, F2, F3, F4 by comparison with a reference detection. Preferably, the latter is obtained with respect to an opposite target. In particular, the reference detection can be obtained at an initial set-up phase of the safety system 100 and stored on a suitable memory (not shown) of the safety control unit 140. For this purpose, the safety system 100 preferably comprises at least a first target (not shown) opposite the TOF sensors F1, F2 and a second target (not shown) opposite the TOF sensors F3, F4. The first and second target may be positioned at the first vertical support 112 and second vertical support 114, respectively, or incorporated in said vertical supports 112, 114. The targets are preferably made of reflective material, adapted to reflect the light emitted from the TOF sensors F1, F2, F3, F4. For example, they may be obtained by selecting a proper reflecting material for coating or making at least a portion of the vertical supports 112, 114. This embodiment advantageously improves the security of the safety system 100 in that it makes it possible to detect not only any possible malfunction of the TOF sensors F1, F2, F3, F4 but also any possible variation with time of the power emitted by them, with respect to the power detected with the reference detection.

In a preferred embodiment, in order to guarantee a SIL (Safety Integrity Level) 2 according to the above mentioned international safety standards, instead of the diagnostic block 144 of FIG. 7, the safety control unit 140 comprises two redundant processors 142, 142' according to the architecture shown in FIG. 8, wherein each processors 142, 142' receives the output signals from the TOF sensors F1, F2, F3, F4 (schematically indicated in FIG. 8 with "FX") and the head position sensor 130, and autonomously and independently process said signals to respectively output two OSSD signals via the OSSD device 145. The wording "TEST" in FIG. 8 schematically represent the above mentioned test periodically made by the redundant processors 142, 142' in order to evaluate the integrity of the detection made by said TOF sensors F1, F2, F3, F4. In this way, redundancy of the TOF sensors F1, F2, F3, F4 is not required.

It is noted that even if a safety system 100 with a single light curtain 110 has been disclosed, the safety system 100 may comprise more than one light curtain 110 to cover multiple dual-areas of a machining plant (that is multiple work stations comprising each a first area and a second area dynamically acting as working area and loading area). The plurality of light curtains will have the same functional and structural features as disclosed above. Moreover, they can lie in a same vertical plane or different vertical planes (perpendicular to the floor), depending on the position of the multiple dual-zones within the machining plant.

In view of the above description, it will be clear that the invention enables to provide a safety system with improved performances.

The use of TOF sensors, adapted to measure the distance of an object breaching the light curtain, advantageously enables to dynamically and selectively make the first area and the second area secure or free with a single light curtain.

In particular, the presence of opposing TOF sensors (F1, F2 opposed to F3, F4) improves the safety of the safety system because it enables to avoid or minimize shadows. Indeed, in case of TOF sensors positioned at one side (vertical support) only, when the loading (permitted) area is located proximal to the TOF sensors, an operator could breach the light curtain by accessing such loading area, whereby the working area located distal to the TOF sensors is shadowed and any detection of breach of light curtain in said working area is hampered.

The use of two couples of TOF sensors guarantees redundancy. Moreover, it enables to increase the height of the light curtain along the vertical direction. In order to further increase the height of the light curtain more than two couples of TOF sensors can be used.

With respect to the use of LEDs, the use of TOF sensors using laser light sources enable to obtain quite collimated (little diverging) light beams so that the distance between the light beams of the light curtain is kept quite constant along a good range of distances (e.g. 0-12 m), along the horizontal direction. Indeed, a laser light beam with a spot diameter of 10 mm has a divergence of 1.3 milliradians (millimeters of degree), i.e. 2.6 mm per meter away, against some degrees of divergence of any LED spot, making the LED unusable for the required range of distances (e.g. 0-12 m). This guarantees that the resolution of the light curtain is kept substantially constant within the working range of distances. Moreover, laser light sources enable to guarantee more stable detections, independently from the color of an object breaching the light curtain (e.g. independently from the color of the uniform of an operator).

With respect to a horizontal arrangement, the vertical arrangement of the TOF sensors make the safety system more robust in that less subject to damages and dust.

With respect to the use of an optical safety laser scanner, the use of TOF sensors enables to reduce costs. Moreover, being possible with TOF sensors to define a suitable resolution of the light curtain, it allows to distinguish wood shavings, debris and dust particles, which may cause false alarms, from an object of interest (e.g. a part of a human body such as an arm).

The invention claimed is:

1. A safety system for an industrial environment comprising a robotic machine that includes at least a moving head of the robotic machine that is configured to move within a first area and a second area of the industrial environment, the safety system comprising:
   a light curtain extending between a first vertical support and a second vertical support to cover a region extending along a vertical plane across both the first area and the second area;
   a head position sensor positioned on the moving head adapted to detect the position of the moving head within the first area and the second area;
   a safety control unit; and
   wherein the light curtain includes a first couple of two TOF sensors respectively positioned at different heights on the first and second vertical supports, the safety control unit being adapted to process output signals received from the TOF sensors and the head position sensor so as to selectively and dynamically secure the first area and the second area.

2. The safety system according to claim 1, wherein the light curtain comprises a second couple of two TOF sensors respectively positioned at different heights on the first and second vertical supports of the light curtain.

3. The safety system according to claim 2, wherein the two TOF sensors of the first couple face each other at different heights on the first and second vertical supports and (ii) the two TOF sensors of the second couple face each other at different heights on the first and second vertical supports, and each of the TOF sensors are at different heights.

4. The safety system according to claim 2, wherein each TOF sensor on the first vertical support is adapted to provide an output signal indicating that a breach of the light curtain occurred at a first range of distances from the TOF sensor.

5. The safety system according to claim 2, wherein each TOF sensor on the second vertical support is adapted to provide an output signal indicating that a breach of the light curtain occurred at a second range of distances from the TOF sensor.

6. The safety system according to claim 5, wherein along a horizontal direction parallel to light beams emitted by the TOF sensors, the first range of distances corresponds to the extent of the first area and the second range of distances corresponds to the extent of the second area.

7. The safety system according to claim 5, wherein along a horizontal direction parallel to light beams emitted by the TOF sensors:
   a first range of distances corresponds to the extent of the first area plus a further extent substantially corresponding to the extent of the moving head, whereby the first range of distances comprises a length of the second area, which is contiguous to the first area, and
   the second range of distances corresponds to the extent of the second area plus a further extent substantially corresponding to the extent of the moving head, whereby the second range of distances comprises a length of the first area, which is contiguous to the second area, and wherein the further extent is shorter than each of the extent of the first area and the extent of the second area.

8. The safety system according to claim 2, wherein the safety control unit is adapted to selectively and dynamically secure the first area and the second area by activating a safety measure in the industrial environment, depending from the output signals received from the TOF sensors and the head position sensor.

9. The safety system according to claim 8, wherein the safety control unit is configured to activate said safety measure in the industrial environment when:
- at least one of the output signals received from the TOF sensors on the first vertical support indicates a breach of the light curtain within the first range of distances and the output signal received from the head position sensor indicates presence of the moving head within the first area; and/or
- at least one of the output signals received from the TOF sensors on the second vertical support indicates a breach of the light curtain within the second range of distances and the output signal received from the head position sensor indicates presence of the moving head within the second area.

10. The safety system according to claim 2, wherein the safety control unit is adapted to periodically perform an integrity test for evaluating the integrity of detections performed by each TOF sensor.

11. The safety system according to claim 10, wherein the safety system comprises a first reflecting target for testing the TOF sensors on the first vertical support and a second reflecting target for testing the TOF sensors on the second vertical support.

12. The safety system according to claim 11, wherein the first reflecting target is at the first vertical support and the second reflecting target is at the second vertical support.

13. The safety system according to claim 11, wherein in order to perform said integrity test, the safety control unit is adapted to periodically compare actual detections made by the TOF sensors with reference detections made in relation to the corresponding reflecting target between said first reflecting target and second reflecting target.

14. The safety system according to claim 2, wherein the TOF sensors comprise laser sources adapted to emit horizontal light beams lying in a vertical plane defining the light curtain.

15. A light curtain of a safety system for selectively and dynamically securing a first area and a second area of an industrial environment wherein at least a moving head of a robotic machine is configured to move within the first area and the second area, the light curtain comprising:
- a first vertical support and a second vertical support;
- a first couple of two TOF sensors respectively positioned at different heights on the first and second vertical supports and respectively adapted to provide output signals to a processor of a safety control unit indicating that a breach of the light curtain occurred at a first range of distances and at a second range of distances from the respective TOF sensor.

16. A method for providing safety in an industrial environment including a robotic machine that includes at least a moving head that is configured to move within a first area and a second area of the industrial environment and a processor of a safety control unit configured to determine location of the moving head, the method comprising:
- establishing a light curtain extending at different heights between a first vertical support and a second vertical support to cover both the first area and the second area;
- detecting position of the moving head within the first area and the second area; and
- processing output signals received from the light curtain and the position of the head so as to selectively and dynamically secure the first area and the second area.

17. The method according to claim 16, wherein processing the output signals includes processing time-of-flight (TOF) signals.

18. The method according to claim 16, further comprising determining a range of the breach of the light curtain.

19. The method according to claim 16, further comprising selectively and dynamically securing the first area and the second area by activating a safety measure in the industrial environment depending from the output signals and position of the moving head.

20. The method according to claim 16, further comprising periodically performing an integrity test for evaluating the integrity of the light curtain.

* * * * *